United States Patent
Heinz et al.

(10) Patent No.: US 7,423,279 B2
(45) Date of Patent: Sep. 9, 2008

(54) SYSTEMS AND METHODS THAT DETECT CHANGES IN INCIDENT OPTICAL RADIATION

(75) Inventors: Philip Heinz, White River Junction, VT (US); Elsa Garmire, Hanover, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 282 days.

(21) Appl. No.: 10/532,453

(22) PCT Filed: Oct. 23, 2003

(86) PCT No.: PCT/US03/33522

§ 371 (c)(1),
(2), (4) Date: Apr. 22, 2005

(87) PCT Pub. No.: WO2004/038325

PCT Pub. Date: May 6, 2004

(65) Prior Publication Data

US 2006/0156822 A1    Jul. 20, 2006

Related U.S. Application Data

(60) Provisional application No. 60/420,623, filed on Oct. 23, 2002.

(51) Int. Cl.
*G01N 21/86* (2006.01)
*G02B 27/42* (2006.01)
*H01S 3/10* (2006.01)
*G01C 21/02* (2006.01)

(52) U.S. Cl. ............... 250/559.32; 250/550; 250/203.3; 372/20

(58) Field of Classification Search ............... 250/214.1, 250/203.3, 550, 559.32, 591; 356/218, 213, 356/498; 257/184; 372/20
See application file for complete search history.

(56) References Cited

U.S. PATENT DOCUMENTS

| | | | | | |
|---|---|---|---|---|---|
| 2,861,262 | A | * | 11/1958 | Pankove | 341/31 |
| 2,959,681 | A | * | 11/1960 | Noyce | 257/539 |
| 3,032,660 | A | * | 5/1962 | Kim | 250/348 |
| 3,875,402 | A | * | 4/1975 | Parkin | 250/203.1 |
| 3,942,898 | A | * | 3/1976 | Anderson | 356/443 |
| 4,079,422 | A | * | 3/1978 | Anagnostopoulos | 348/306 |
| 4,471,270 | A | * | 9/1984 | Guyot | 315/374 |
| 4,576,481 | A | * | 3/1986 | Hansen | 356/620 |
| 4,697,074 | A | * | 9/1987 | Ito et al. | 250/214.1 |
| 4,863,270 | A | * | 9/1989 | Spillman, Jr. | 356/477 |
| 4,935,618 | A | * | 6/1990 | Naito | 250/214 R |
| 5,430,546 | A | * | 7/1995 | Huber | 356/499 |

(Continued)

FOREIGN PATENT DOCUMENTS

EP    0 359 360 A2    3/1990

(Continued)

*Primary Examiner*—Patrick Connolly
*Assistant Examiner*—Scott M Richey
(74) *Attorney, Agent, or Firm*—Lathrop & Gage LC

(57) ABSTRACT

Systems, methods and sensors detect changes in incident optical radiation. Current is driven through one or more active areas of a detector while the incident optical radiation illuminates the active areas. Voltage is sensed across one or more of the active areas, a change in the voltage being indicative of the changes in incident optical radiation.

44 Claims, 8 Drawing Sheets

U.S. PATENT DOCUMENTS

| | | | |
|---|---|---|---|
| 5,614,708 A * | 3/1997 | Koishi et al. | 250/214 C |
| 5,670,777 A * | 9/1997 | Inushima et al. | 250/214.1 |
| 5,793,357 A * | 8/1998 | Ivey et al. | 345/166 |
| 6,201,234 B1 * | 3/2001 | Chow et al. | 250/214 LS |
| 6,242,740 B1 * | 6/2001 | Luukanen et al. | 250/353 |
| 6,465,784 B1 * | 10/2002 | Kimata | 250/332 |
| 2003/0035111 A1 * | 2/2003 | Nevis | 356/484 |

FOREIGN PATENT DOCUMENTS

| | | |
|---|---|---|
| EP | 0 903 566 A2 | 3/1999 |
| EP | 1 041 371 A | 10/2000 |
| GB | 2 272 763 | 5/1994 |
| JP | 60 196 676 A | 2/1986 |

* cited by examiner

FIG. 7
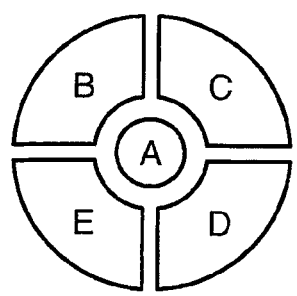
FIG. 7A
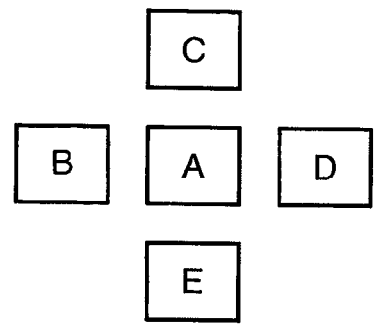
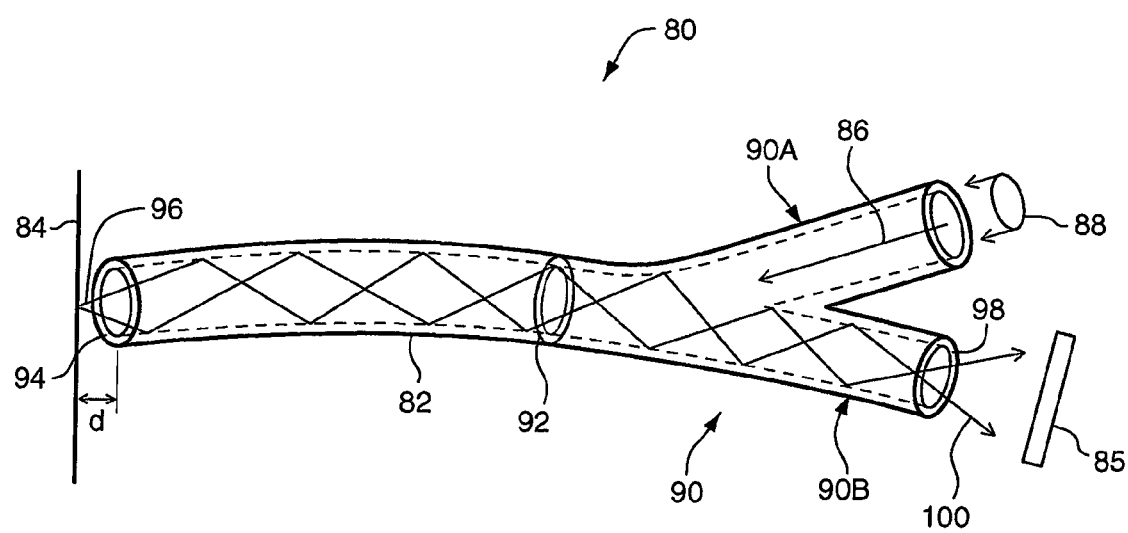
FIG. 8

SYSTEMS AND METHODS THAT DETECT CHANGES IN INCIDENT OPTICAL RADIATION

RELATED APPLICATIONS

This application claims priority to U.S. provisional application Ser. No. 60/420,623, filed 23 Oct. 2002 and hereby incorporated by reference.

BACKGROUND

Examining surface displacement (e.g., vibration) of an object or surface with optical radiation has advantages in many settings, for example in high-temperature or vacuum conditions where physical contact with the object or surface could easily damage expensive equipment or disrupt the desired vacuum conditions. In another example, it is advantageous to perform contactless, nondestructive testing of structural members or mechanical components, for example for ultrasonic movement of the members or components, or to search for defects. Among various techniques proposed to exploit these advantages, techniques that employ the Fabry-Perot interferometer, the photo-emf effect or photorefractive crystals appear most promising, largely due to their ability to detect nanometer-scale vibrations of rough surfaces in the presence of speckle (speckle is created when the surface under investigation is optically rough, such that laser illumination of the surface and collection of backscatter results in speckle). Nonetheless, each of these techniques also requires "referencing," which utilizes signal and reference beams from the same wavefronts during direct interferometric detection; for practical applications, this referencing requires additional optical components that often misalign while detecting intensity changes or speckle patterns in the optical radiation, particularly in the presence of mechanical vibration or movement. Misalignment may cause critical failures, because altering the angular relationship between signal and reference beams also changes the grating spacing on the detector. Prior art techniques (for example utilizing the photo-emf effect) are very sensitive to operating at precisely the right grating spacing.

Prior art devices that measure speckle patterns or changes in incidental optical radiation also utilize the power in the optical radiation to drive the output signal Such devices are problematic because, for example, the power available to these devices is dependant on the detecting area; the electronic output depends on the detecting area so that scaling the device to smaller size results in lower output. Among other drawbacks, this impedes vibration detection since the detecting area must be smaller than the speckle size to avoid signal attenuation and to avoid averaging of variations across the sensing element.

Prior art optical detectors are also problematic whenever a small detecting area is needed and the intensity of the optical radiation is weak. For example, in such situations, photodiodes and photodiode arrays generate very small currents, from micro-amps to nano-amps, that are very hard to measure; they also generate signals that are significantly impacted by noise and interference. Improvements to optical detectors are therefore needed.

SUMMARY OF THE INVENTION

Certain optical radiation detectors described hereinbelow are useful in the measurement of time-varying optical radiation. The detectors may provide a voltage output that is less sensitive to electromagnetic interference as compared to optical detectors of the prior art.

In one embodiment, an optical sensor has a detector made of photoconductive material; the photoconductive material's photoconductivity depends on the intensity of the incident optical radiation. The sensor may employ one of three alternative methods to measure change in the intensity: in the first method, the sensor injects a constant current to the detector and measures the change in voltage drop across one or more active areas of the photoconductive material; in the second method, the sensor applies a constant voltage across the detector so that one or more active areas of the detector form a voltage divider, wherein the distribution of voltage drops across the active areas then depends on illumination by the incident optical radiation. The second method may also employ a fixed resistance connected in series with the active areas, to form the voltage divider. In the third method, the applied voltage or current is modulated by a square wave or other waveform (e.g., a periodic modulation such as a sine wave). Selective amplification at the frequency of the modulation may help to achieve higher signal-to-noise ratios.

In one examplary use of the optical sensor, a four-point measurement is made in which current is sourced and sunk through two contacts to the photoconductive material; and the voltage drop is observed across an illuminated active area formed by two additional contacts placed between, and collinear with, the two current source/sink contacts. Additional active areas may be formed by adding additional contacts between the current source/sink contacts. One exemplary optical sensor employs four active areas fabricated with semi-insulating gallium arsenide (GaAs), though other detector materials may be employed.

The optical sensor may be used to detect vibrations and surface displacements by observing the changes in interference or speckle patterns due to surface motion (e.g., continuous or transient surface motion with amplitudes of the order of nanometers, or higher). This detection is for example useful to assess mechanical resonances and ultrasonic waves associated with non-destructive testing. When the detector has an array of active areas, as opposed to a single point detector element, signal processing electronics may average the output of the individual active areas to provide a large and observable signal, without the need for nonlinear phase-compensating elements of the prior art. Accordingly, laser light scattered off an optically rough surface forms the speckle pattern that reconfigures and/or moves laterally as the surface displaces, either due to a mechanical resonance or due to an ultrasonic wave. As the speckle pattern moves, local variations in optical intensity are detected by the optical sensor.

Certain advantages may be realized by the optical sensor. First, an external current or voltage source powers the detector, which then uses optical power from the incident radiation to modulate the constant current with information content. The incident optical radiation is therefore not used as the power source to drive the signal, as in certain devices of the prior art. The same advantage is obtained when using the detector with a voltage source. Second, the optical sensor may be scaled to small size (e.g., in the micrometer range) since the photoconductivity of the photoconductive material depends on the detector's aspect ratio rather than on total surface area This allows for detection over a single speckle, making it possible to reduce dimensions of the optical arrangement illuminating the surface to a portable unit (e.g., a unit employing optical fiber). Third, by using the four-point measurement, a voltage output is produced that is compatible with observation instruments such as an electronic scope or spectrum analyzer. The voltage ouput is for example millivolts, compared to nanoamps to microamps generated by photodiodes used in comparable applications.

The optical sensor may have various applications, and may be conveniently employed with known systems that generate ultrasonic waves in objects. By way of example, it may be used with laser-based ultrasound to measure sample thicknesses or to detect defects. In this example, a pulse laser generates a high-power pulse (e.g., a pulse with megawatts of power and with nanoseconds of illumination) on the surface of the sample to generate ultrasonic waves in the sample. A separate detection laser (e.g., a HeNe laser) then illuminates the sample and the optical sensor detects changes in optical radiation reflected off of the surface. In another example, piezoelectric transducers generate the ultrasonic waves in the object; the detection laser and optical sensor are then used to non-destructively test the object (e.g., for defects or object thickness).

The optical sensor may also be used within manufacturing (e.g., for quality assurance issues), for example, or within transportation (e.g., for safety issues). Non-destructive testing in manufacturing, for example, enables quality control by detecting defects (e.g., cracks and inclusions in finished products). Another application for the optical sensor is within metal processing, where continuity checks of thin sheet goods can be made by detecting Lamb waves. Yet another application for the optical sensor is the determination of how many balls are in a bearing. In transportation, the optical sensor may be deployed in the detection of cracks, inclusions or other defects in solid objects, such as railroad tracks, wheels, axles, wings, hulls or other components of trains, cars, trucks, ships or aircraft. In civil engineering, the optical sensor may be employed in integrity tests of steel girders, bridges, or similar structural components. Misalignments due to earthquakes, ground shifting or structural weaknesses can also be monitored through use of the optical sensor. In medical applications, the optical sensor may be deployed, for example, in the detection of cavities in teeth.

In addition to ultrasonic testing, the optical sensor may be used at lower frequencies, to measure vibrations (e.g., audible or sub-sonic vibrations). For example, the optical sensor may enhance security applications by remotely monitoring conversations through vibrating windows of a building or by determining whether activity exists within a vehicle through vibrations of the vehicle.

Because the detector of the optical sensor may be scaled in size to be compatible with multi- and single-mode optical fibers, the optical sensor may also be used when illumination is provided by fibers. Accordingly, when vibration of a surface hidden from view needs to be monitored, the detector and optical fibers may be disposed in hard to reach locations that heretofore were inaccessible. In one example, detection of cavities in teeth may require fiber illumination.

Fibers may also be employed within certain communications systems, and so the optical sensor may have application within communications. For example, by placing the active area of the detector onto an optical fiber, with its area matched to that of a single mode fiber, changes in optical radiation from the fiber may be detected. If the detector employs an array of active areas, the optical sensor may also be employed with fiber arrays, for LED-driven parallel systems. An optical sensor employing the arrayed detector may also be used to sense higher-order Gaussian beams in free-space communications systems.

The detector may employ a two-dimensional array of active areas, to facilitate optical imaging. In one example, the arrayed detector may be used as a type of spatial filter, for example to facilitate precision alignment of machinery. Other arrayed detectors may be used in tracking, as a navigation aid for ships, aircraft, or missiles, or as a motion sensor, detecting, for example, intruders.

In measurements of vibration, the optical sensor may be used in a "referenceless" configuration, since it does not require direct interferometric detection. It may also operate without significant optical alignment. These benefits occur because the optical detector can be made very small and used with an array of active areas; the optical sensor lends itself to use in referenceless experimental setups that do not depend on direct interferometric detection.

In one embodiment, a method detects changes in incident optical radiation. Current is driven through one or more active areas of a detector while the incident optical radiation illuminates the active areas. Voltage is sensed across one or more of the active areas, a change in the voltage being indicative of the changes in incident optical radiation.

In another embodiment, a method determines surface motion, including: illuminating a surface with a laser having a wavelength that is smaller than defined geometric features of the surface; and detecting moving speckle indicative of surface motion by: driving current through one or more active areas of a detector while the moving speckle illuminates the active areas; sensing voltage across one or more of the active areas to detect the surface motion.

In one embodiment, a method determines surface motion, including: generating an interference pattern that varies with surface motion; and detecting the interference pattern by: driving current through one or more active areas of a detector while the interference pattern illuminates the active areas; and sensing voltage across one or more of the active areas to detect the surface motion.

In one embodiment, a sensor detects changes in incident optical radiation. A detector has one or more active areas formed of photoconductive material. A source applies current through the active areas. Electronics determine voltage drop across at least one of the areas, the voltage drop being indicative of the changes in incident optical radiation.

In one embodiment, an optical radiation detector is provided. The detector has photoconductive material forming one or more active areas. Input electrodes provide for connection to a source, to drive current through the active areas. Output electrodes provide for connection to an observation instrument, to sense voltage drop across one or more of the active areas.

In one embodiment, a method aligns two objects, including: generating an interference pattern dependent upon a distance between the two objects; and sensing changes in the interference pattern to achieve optimal alignment between the objects by: driving current through one or more active areas of a detector while the interference pattern illuminates the active areas; and sensing voltage across one or more of the active areas, a change in the voltage being indicative of a change in the distance between the objects.

BRIEF DESCRIPTION OF THE DRAWINGS

FIG. 7 and FIG. 7A illustrate exemplary arrangement of electrodes and active area for a detector electrically connected as in FIG. 1.

FIG. 8 shows an illustrative illumination arrangement using a multimode optical fiber, to monitor an object with a detector.

DETAILED DESCRIPTION OF ILLUSTRATED EMBODIMENTS

Figure 1:
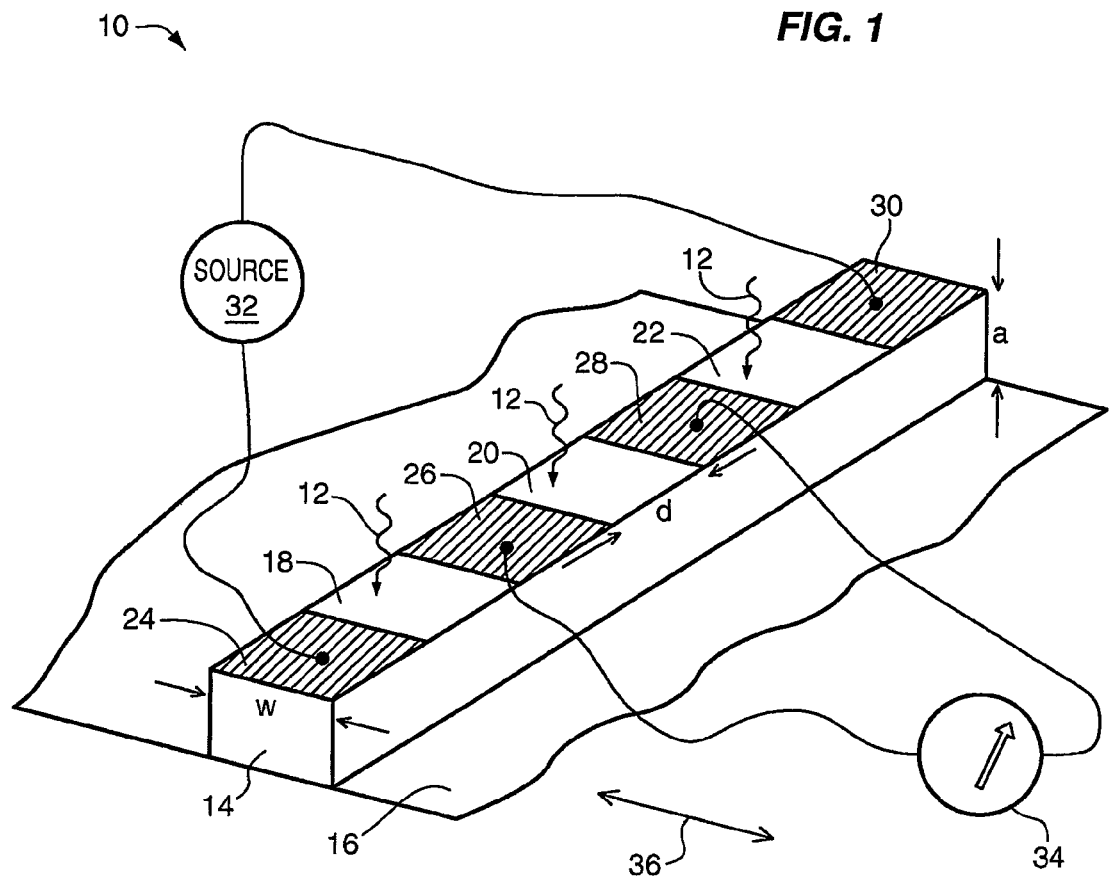
FIG. 1 illustrates one optical sensor for detecting changes in incident optical radiation.

FIG. 1 shows an optical sensor 10 that detects intensity changes in optical radiation 12 incident on its detector 14, through a four-point measurement. Detector 14 is formed (e.g., etched) from a photoconductive substrate 16 and includes one or more photosensitive regions (active areas) 20, and an array of connectivity points (electrodes, or contacts) 24, 26, 28, 30. A source 32 connects to outer two connectivity points 24, 30, to power detector 14; and an observation instrument 34 measures voltage across two inner connectivity points 26, 28, as shown. Source 32 is for example a direct current source, a voltage source, or a source that applies time-varying current or voltage to detector 14. Observation instrument 34 is for example an electronic oscilloscope that monitors a resulting time-varying voltage signal from inner connectivity points 26, 28, indicating time-varying change of intensity in incident radiation 12 on active area 20. By analyzing this time-varying signal on a frequency basis (e.g., through use of a spectrum analyzer as observation instrument 34), frequency-dominant voltage signals may be isolated to indicate modulation of the incident optical radiation 12 (for example caused by vibrating surfaces interacting with or reflecting optical radiation 12 at ultrasonic frequencies).

Detector 14 is also shown with two other active areas 18 and 22, which are used in the four-point measurement, but which are not used to detect radiation 12 for detector 14. If detector 14 were made without active areas 18, 22 (that is, active areas 18, 22 were not present), the injected current to detector 14 would flow through electrodes 26, 28, used for the four-point measurement; and the four-point measurement would instead depend on the physical characteristics of electrodes 26, 28. With the four-point measurement as in FIG. 1, current does not flow through electrodes 26 and 28, so that the four-point measurement is independent of contact characteristics. This is useful because it is frequently difficult to form high-quality contacts on many materials. Accordingly, active areas 18, 22 are not used as actual sensing elements for detector 14 in the configuration of FIG. 1. Upon reading and fully comprehending this disclosure, those skilled in the art thus appreciate that active areas 18, 22 may be formed of semiconducting or resistive material to provide like function (i.e., to provide current flow through active area 20, from source 34). Moreover, if contacts 24, 26, 28, 30 have sufficiently high quality, it is possible that detector 14 function in like manner without active areas 28, 22 (that is, contacts 24, 26 are adjacent one another and not spaced apart by element 18, and contacts 28, 30 are adjacent one another and not spaced apart by element 22).

If source 32 is a constant voltage source, then the voltage drop across active areas 18, 22 may be taken into account. Specifically, if illumination of active area 20 changes, the voltage drop will change if there is a differing intensity change incident on active areas 18, 22 as compared to active area 20. Accordingly, there may be a situation where detection is nullified, though rare in occurrence. For example, if active areas 18, 22 are "dark" (not illuminated), the voltage drop across active area 20 accurately detects changes in incident optical radiation 12. Accordingly, in one embodiment, a mask (not shown) covers active areas 18, 22 such that they are dark, but the dimensions of areas 18 and 22 are chosen such that they still carry current from source electrode 24 to drain electrode 30. Preferably, the dark conductivity of regions 18, 22 is high enough that they are not highly resistive. Active areas 18, 22 may also be made kept very thin to enable current flow through relatively high resistivity material. This will also reduce problems associated with illumination of regions 18, 22. Keeping active areas 18, 22 in the dark by a mask or other means may thus depend upon the material and geometry used to provide one solution ensuring a variation in voltage drop across active area 20 is proportional to its illumination.

As intensity of incident radiation 12 varies, the photoconductance S of material between connectivity points 26, 28 is determinable. As in Equation 1 below, photoconductance S depends on the active area's aspect ratio (width w divided by length d) for a given absorption depth a, such that detector 14 may be scaled down to the desired small size without loss of signal:

$$S = \sigma a \frac{w}{d} \qquad \text{(Equation 1)}$$

σ stands for conductivity, which depends on the carrier concentration generated by incident optical radiation 12. The carrier concentration depends on the intensity of incident radiation 12, rather than the total power absorbed, so that photosensitive regions 18, 20, 22 may be sized to fit within a desired grating spacing (or to some other desired dimension, such as to correspond to speckle size). The arrangement of electrodes 24, 26, 28, 30 may be chosen so as to prevent diffusion of charge carriers out of detector 14. This can be achieved, for example, by selecting width w to be typically at most one diffusion length wide (dimension w), while depth a is typically at least one diffusion length deep (dimension a). This ensures that photogenerated charge carriers will recombine before they can contribute to conductivity outside the region of interest.

With regard to active areas 18, 22, width w and length d need not be the same as active area 20. In one embodiment, for example, width w and length d for active areas 18, 22 are chosen (e.g., via doping density of the photoconductive material) so that current flows through active area 20, but also such that there is no short-circuit between electrodes 24, 26 and 28, 30, respectively.

The photoconductive area forming active area 20 is for example a semiconductor. For example, the photoconductive material may comprise either a III-V semiconductor or a II-VI semiconductor. A III-v semiconductor is defined by one or more components of the composition from the II column of the periodic table, and one or more components of the composition from the V column. A II-VI semiconductor is defined by one or more components of the composition from the II column of the periodic table, and one or more components of the composition from the VI column.

Figure 2:
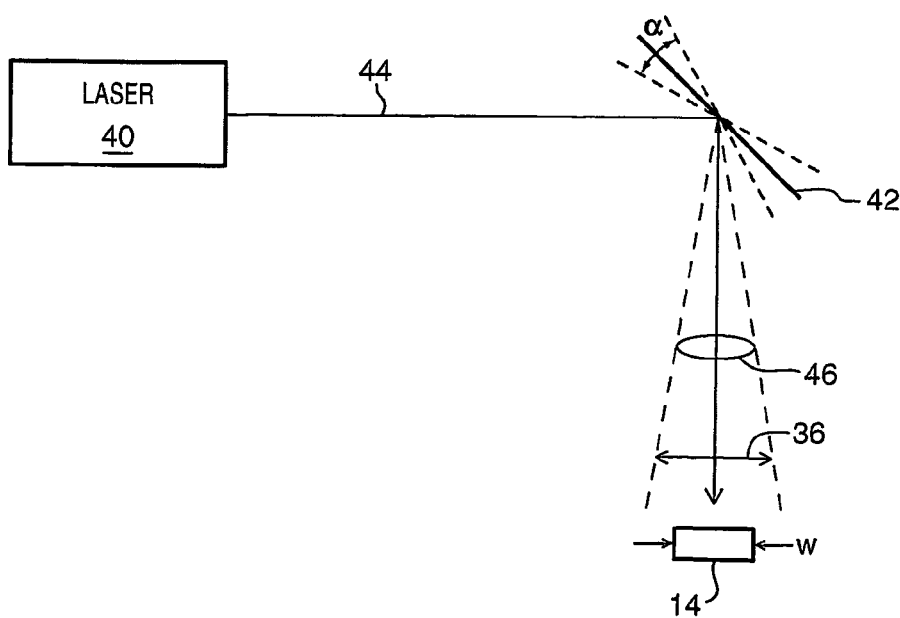
FIG. 2 shows an illustrative illumination set-up to that generates incident optical radiation with time-varying intensity.

Note that the variation of intensity in incident optical radiation 12 may occur through cyclical (e.g., periodic) motion of optical radiation 12 back and forth across detector 14, along a direction 36, and typically at one or more dominant frequencies. The variation in intensity may also occur through transient motion of optical radiation 12 across detector 14, along direction 36. Direction 36 is shown illustratively; however the cyclical or transient motion of optical radiation 12 may occur in any orientation relative to detector 14. FIG. 2 illustratively shows how the cyclical or transient motion may occur. A laser 40 illuminates a surface 42 (with a laser beam 44) that tilts through an angle α (or that displaces parallel or perpendicular to surface 42) due to vibration or transient displacement of surface 42; this vibration typically occurs with peak energies at resonant or dominant frequencies. Backscattered radiation 46 from laser beam 44 illuminates detector 14 with a time-varying intensity pattern along direction 36 (also at the dominant frequencies, in the case of cyclical motion of optical radiation 12 back and forth across detector 14). Backscattered radiation 46 may include speckle when surface 42 is optically rough in comparison to the wavelength of laser beam 44 (that is, the wavelength is much smaller than defined geometric features of surface 42). If surface area wd of active area 20 corresponds in size to an average speckle, then one active area 20 may detect that speckle. Laser 40 is for example an Argon laser emitting a laser beam 44 at about 488 nm.

By sensing voltage drop across active area 20, sensor 10 produces time-varying voltage that may be analyzed in the time domain or in the frequency domain. Accordingly, it should therefore be clear that detector 14 monitors both periodic and transient motion of optical radiation 12 across detector 14 (for example, along direction 36). Periodic motion may relate to resonant behavior (e.g., vibration) of a surface which reflects radiation 12 to detector 14, for example, while transient motion may for example relate to ultrasonic testing. Hereinafter, periodic and transient motions may be collectively denoted as "motion."

Figure 3:
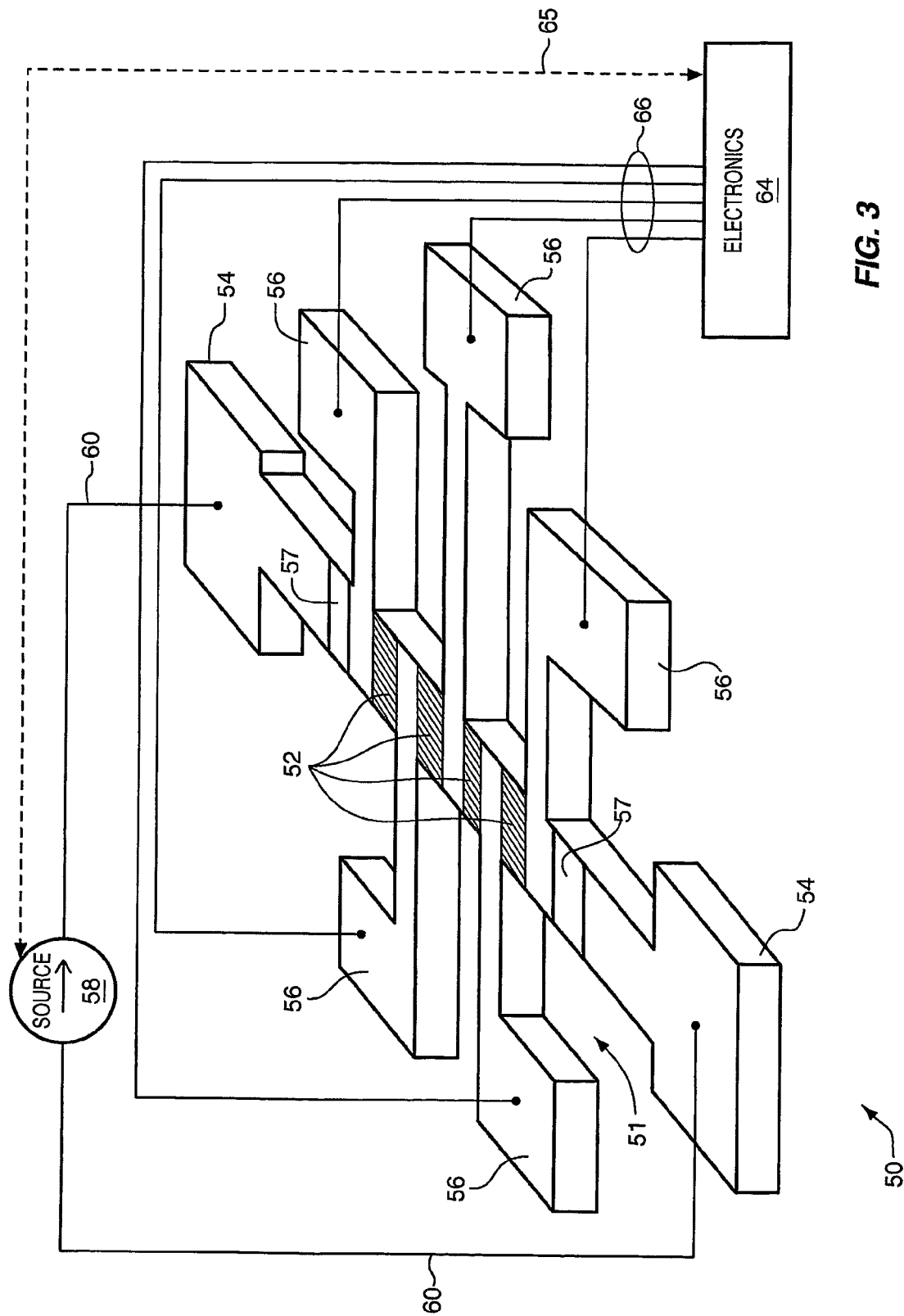
FIG. 3 shows a schematic illustration of one optical sensor for detecting changes in incident optical radiation.

To increase confidence of detection, to add detection redundancy, to exploit spatial characteristics of illumination, and/or to provide other features as a matter of design choice (such as to provide imaging functionality), additional active areas may be incorporated into detector 14, such as shown in FIG. 3. In FIG. 3, an optical sensor 50 has a detector 51 with four active areas 52, two input connectivity electrodes 54, and five output connectivity electrodes 56. A current source 58 powers sensor 50 through electrical connections 60 to outer electrodes 54. The voltage drop across each active area 52 is measured by electronics 64 (e.g., an observation instrument 34, FIG. 1), which connects to output electrodes 56 through electrical connections 66 as shown. A semiconducting material 57 separates electrodes 54 from electrodes 56 so that only characteristics of active areas 52 are measured by electronics 54 (for example, semiconducting material 57 comprises the same photoconductive substrate forming active areas 52, similar in function to areas 18, 22 of FIG. 1). With an optical sensor 50 such as shown, each active area 56 may be used to detect an individual speckle such as described in connection with FIG. 2, providing high confidence in actual detection. Signals from active areas 52 may be averaged to increase the signal-to-noise.

Although four active areas 52 are shown in FIG. 3, it should be apparent that additional or fewer active areas 52 may be incorporated into detector 51 as a matter of design choice.

It should also be clear from FIG. 3 that the configuration of active areas 52 may also be chosen to detect an interference pattern with a known (or expected) spacing between constructive and destructive fringes, such that at least one active area 52 is assured to fit within one spatial period of the pattern. By including multiple active areas 52, the requirements for optical alignment of the system that generates the interference pattern are less stringent, since any one of areas 52 may be used to detect intensity changes in the pattern.

In one embodiment, electronics 64 includes a controller (or computer) that also controls modulation of source 58 (e.g., through a control line 65). By modulating injected current or applied voltage to detector 51, selective amplification of the output of sensor 50 at the modulation frequency may be employed to assist in reducing noise. Electronics 64 may also monitor signals of source 58 through control line 65, as a matter of design choice.

A prototype of detector 51 was fabricated in semi-insulating GaAs. Prototype detector 51 was fabricated by etching bulk material away from an underlying substrate (e.g., substrate 16, FIG. 1). Electrodes 54, 56 were deposited onto detector 51 to form four collinear active regions 56 of dimensions 40×100 μm (for dimensions wd). The driving current from source 58 was approximately two microamperes.

EXPERIMENT 1

Figure 4:
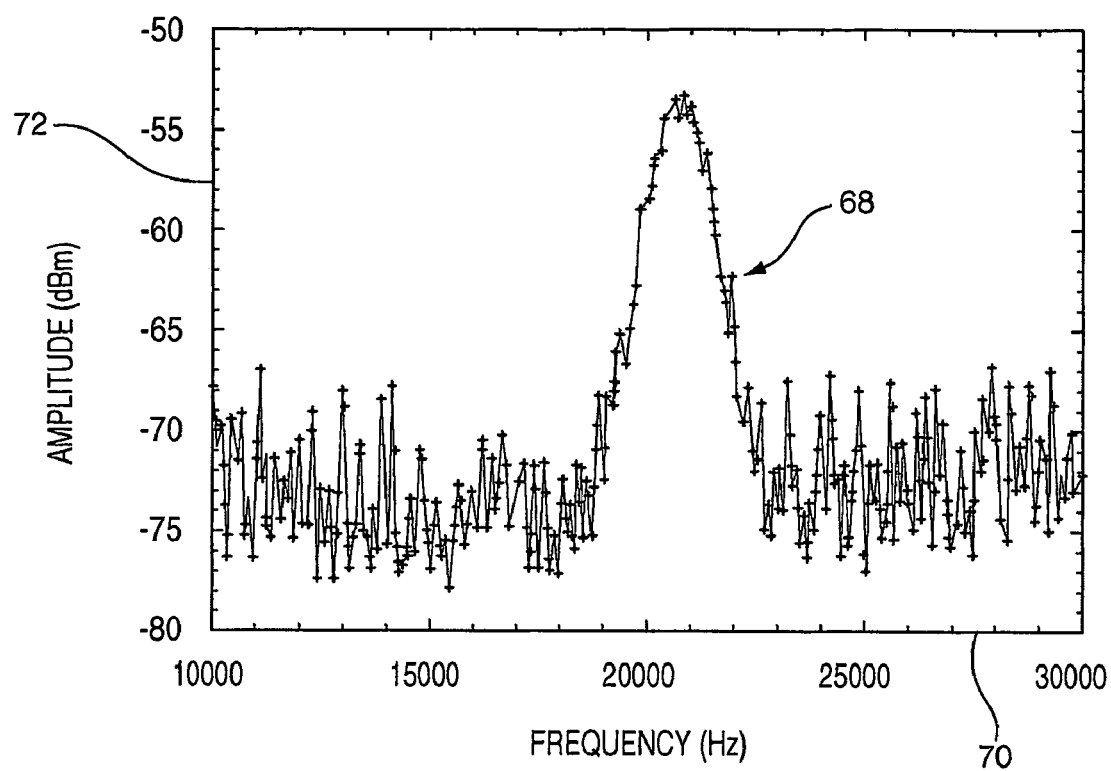
FIG. 4 graphically shows the signal output from one experimental sensor, indicating detection of a lateral speckle pattern displacement.

The prototype detector 51 was also tested experimentally, by mounting prototype detector 51 within in a dual-inline-package header that connected to electronics 64. Electronics 64 (in this experimental example) amplified the potential difference across each active region 52 and then summed the positive signals from all active regions 52. In order to demonstrate remote measurement of vibrations, an argon laser beam of wavelength λ=488 nm was slightly focused upon a white piece of paper, mounted taut in front of a high-frequency loudspeaker, to a spot size of about D=0.6 mm diameter. The surface normal to the paper was arranged to form 45-degree angles with both the laser beam and a surface normal of detector 51. The laser beam propagated at 90 degrees with respect to the surface normal of detector 51, much like the configuration shown in FIG. 2 (with the paper forming surface 42, and the experimental prototype detector 51 positioned at detector 14 in FIG. 2). The distance from the illuminated spot to detector 51 was approximately L=5 cm. Using $$d = 1.2 \frac{\lambda L}{D}$$

as an estimate for the average size of a speckle gives an approximate speckle size d~50 μm, comparable to the dimensions of the prototype sensing element 52 (40×100 μm). Application of a sinusoidal driving voltage to the loudspeaker caused vibrations of the paper, resulting in lateral and cyclical displacement of the speckle pattern on detector 51 (e.g., back and forth motion 36 over detector 14, FIG. 1). This in turn caused cyclical variations in sensed voltage from prototype detector 51. Using a spectrum analyzer as electronics 64, the voltage signal at a dominant frequency 68 was clearly visible, as shown in FIG. 4 (x-axis 70 shows frequency while y-axis 72 shows signal amplitude from prototype detector 51). Dominant frequency 68, which is 20 kHz, is borderline ultrasonic. In this case, vibrations of the whole object (paper) were detected, as opposed to detecting ultrasonic waves in a solid.

Different experiments were performed to prove that prototype detector 51 works for ultrasonic frequencies.

EXPERIMENT 2

Figure 5:
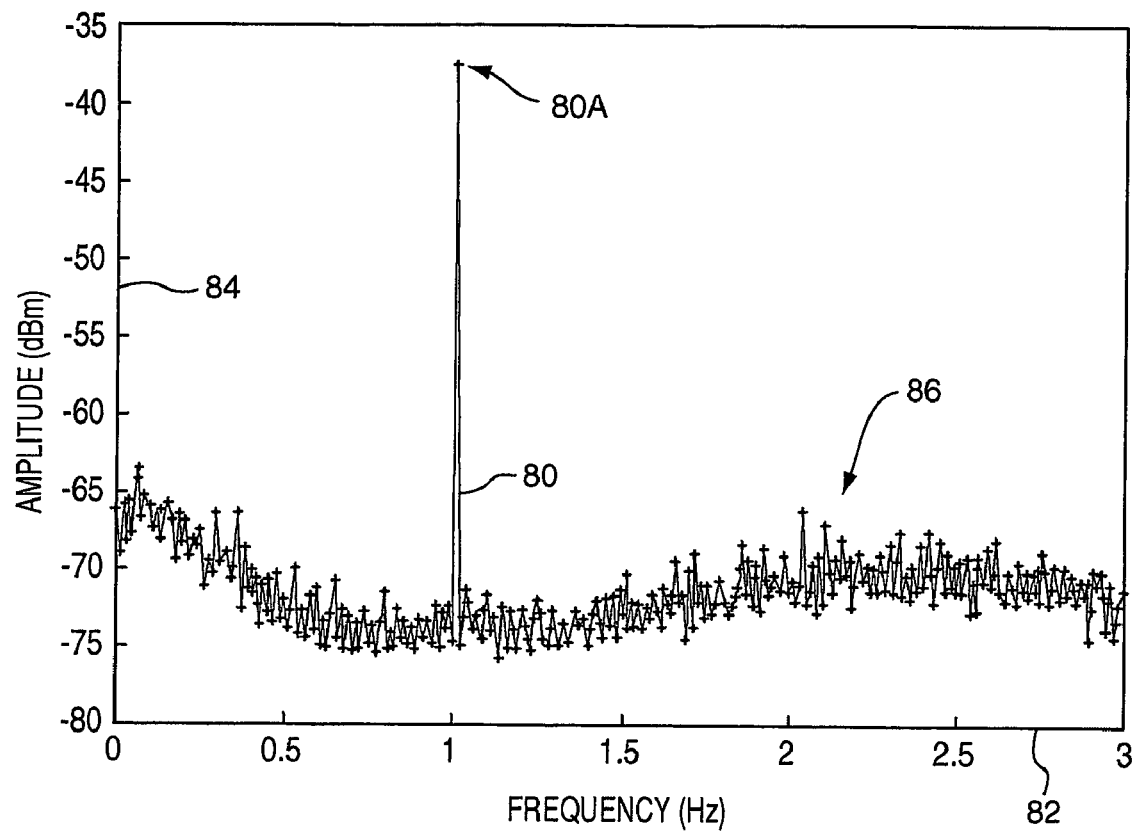
FIG. 5 graphically shows the signal output from the experimental sensor, indicating detection from an electro-optic modulator operating at one megahertz.

Another experiment was conducted with prototype detector 51. A LiNbO3 electro-optic modulator was placed between a polarizer-analyzer pair; the input polarizer's transmission axis was oriented so as to ensure that light entering the modulator has polarization components along both optical axes. The electrodes of the modulator were not aligned parallel to the principal optical axes of the crystal, so that an applied voltage has different effects on the refractive indices along both axes (which have different electro-optical coefficients). A relative phase difference between the two polarization components is therefore induced, and application of a periodically varying voltage leads to a periodically varying amplitude past the analyzer. Under illumination by a helium-neon laser of wavelength $\lambda=632.8$ nm, a clear output signal was observed on the spectrum analyzer for a sinusoidal voltage of frequency 1 MHz applied to the electro-optic modulator, with an average incident intensity of 0.15 mW/cm2 and an intensity modulation depth of m=0.6. The resulting frequency dominant output signal 80 is shown in FIG. 5. In FIG. 5, x-axis 82 shows frequency while y-axis 84 shows signal amplitude from prototype detector 51. The peak 80A of signal 80 corresponded to the modulation frequency of 1 MHz and is clearly visible, rising about 30 dB above the noise floor 86. This ratio may be improved further, for example, by suppressing the slight gain peaking of the amplifying circuit to achieve a flat frequency response.

Other experiments were performed at frequencies important in ultrasonic testing, from hundreds of kilohertz up to 2 MHz, to determine the sensitivity of the prototype detector 51. At 1 MHz, reducing the modulation depth to m=0.2 reduced the observed peak to −50 dBm, and a further reduction to m=0.05 led to a further decrease to −60 dBm. Accordingly, even for these lower modulation depths, the prototype optical sensor 50 successfully produced a clear output signal, rising 15 to 25 dB above the noise floor.

Although electrodes and active areas in FIG. 1 and FIG. 3 are configured in a collinear fashion, this is not required. For example, alternative contact configurations are shown in FIG. 7 and FIG. 7A. In FIG. 7 and 7A, the photosensitive active area is denoted as A, current is injected through electrodes B and D, and voltage is measured across monitoring electrodes C and E. Electrodes B, C, D, E are then electrically connected as shown in FIG. 1. That is, consider active area 20 positioned at A in FIG. 7, electrodes 24, 20 positioned at B, C, respectively, and electrodes 26, 28 positioned at D, E, respectively. By injecting current through electrodes 24, 30 and by sensing voltage across electrodes 26, 28, changes of incident optical radiation are detected through active area 20 at position A. The material or connectivity between elements A, B, C, D, E should permit current flow from electrode B to D, and through area A, and also permit measurement of the voltage drop across element A. In one configuration, this material comprises the same photoconductive substrate forming area A (such as in FIG. 1). In one embodiment, trenches (not shown) may be formed (e.g., by etching) between B,C,D,E to ensure that current flows only through active region A and not directly between electrodes B,C,D,E. Other techniques may be used to provide like function, for example disposing a resistive, insulating material between electrodes B,C,D,E and active area A. Those skilled in the art appreciate that active area A may comprise multiple active areas, such as areas 52 of FIG. 3.

There is also no requirement that all electrodes B, C, D, E be in the same plane. In one example, it may be preferable for manufacturing, for sensitivity, and/or for 2D or 3D detector arrays, to have sensing electrodes C, E and/or injecting electrodes B, D in one or more planes that are above and below the plane of active area A. By analogy, electrodes 54, 56 of detector 51, FIG. 3, may also be positioned in different planes or locations, as a matter of design choice. Moreover, active areas such as area A or areas 52 (FIG. 3) may also be positioned to form, for example, two-dimensional or three-dimensional detection arrays, as a matter of design choice.

In one embodiment, one or more epitaxial thin films may be grown on a substrate for the active areas (e.g., areas 52, FIG. 3) and/or the electrodes (e.g., electrodes 54, 56, FIG. 3). Epitaxial thin fills may for example help increase optical absorption and/or keep carriers from diffusing into the substrate. Certain materials can be manufactured only in thin film form, such as InGaAs. By tailoring these thin films onto the active areas, a detector (e.g., detector 51) may also preferentially detect certain wavelengths or wavebands.

FIG. 8 shows an illustrative illumination arrangement 80 using a multimode optical fiber 82 to monitor a surface 84 with a detector 85 (e.g., detector 14 of FIG. 1, detector 51 of FIG. 3, or detector A of FIG. 7, 7A). Optical radiation 86 is generated by a laser or LED 88; radiation 86 enters one arm 90A of multimode fiber power splitter 90, which couples to multimode mode fiber 82 through a coupler or splice 92. An end 94 of fiber 82 is placed a small distance d away from the rough surface area of surface 84 to be monitored. Optical radiation 86 that reflects from surface 84 will exhibit time-varying changes if surface 84 vibrates, if fiber 82 moves across surface 84, or if distance d changes (e.g., through tilt or movement of surface 84). This reflected radiation 96 is also collected by multimode fiber 82 through end 94, and interferes with optical radiation 86 that reflects from the air-glass interface at fiber end 94. The two interfering optical signals mix within multimode fiber 82 such that some of this mixed signal 100 emits from a fiber end 98 of another arm 90B of splitter 90, for detection by detector 85. The multimode interference pattern that illuminates detector 85 is time-varying in accordance with the movement of surface 84 (or end 94 or d). The use of fiber 82, 90 enables the measurement to reach surface 84 hidden from view, for example if surface 84 corresponds to a surface of a tooth. It also provides an opportunity to capture a large fraction of light scattered from surface 84 without the use of bulky optics. The function of fiber power splitter 90 may be implemented with classical non-fiber optics ("bulk optics") as a matter of design choice. Multimode fiber 82 may be replaced with a single mode fiber in certain applications. It is thus apparent that the geometry shown in FIG. 8 may be generalized to an array. That is, an array of fibers 82 may be used to illuminate surface 84; in such a case, the optical sensor utilizes an array of detectors 85 (e.g., detector 51 with an array of elements 52, FIG. 3) designed to spatially match the fiber array (alternatively, an array of optical sensors, each with one or more detectors 85, may be employed wherein the detectors again spatially match to the array of fibers, to provide like detection from the array of fibers).

Figure 9:
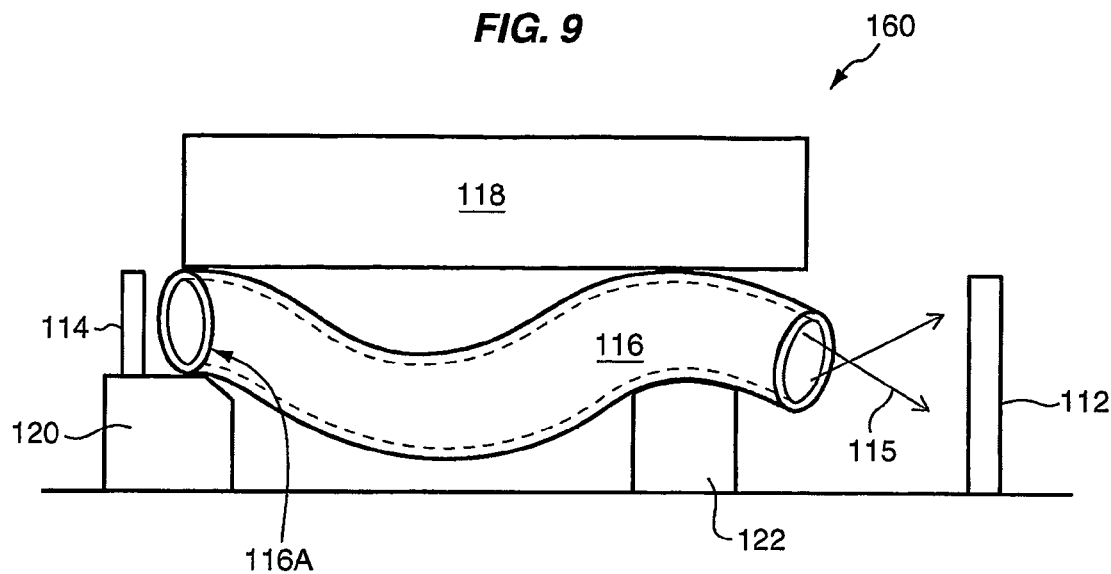
FIG. 9 shows one multimode fiber optic sensor.

FIG. 9 shows one multimode fiber optic system 110, which includes an optical sensor 112 (e.g., sensor 10 of FIG. 1, or sensor 50, FIG. 3), a laser or LED 114, and a multimode optical fiber 116. Sensor operates to detect perturbations of fiber 116—for example caused by a weight 118 lying on fiber 116—by detecting changes in optical radiation 115 from multimode fiber 116. In particular, an end 116A of fiber 116 is illuminated by laser or LED 114. A pair of fiber holders 120, 122 illustratively hold fiber 116 while weight 118 perturbs fiber 116; the perturbation changes the multimode interference pattern within fiber 116 that illuminates optical sensor 112 with radiation 115. The varying pattern thus enables sensing of the presence of weight 118.

It should be apparent that sensor 110 similarly works for other causes of fiber perturbation—such as pressure, temperature, magnetic field, electric field and/or the presence of chemicals—in place of weight 118. For example, when fiber 116 is in the configuration of a coil of fiber, placement of a human hand adjacent to fiber 116 (and not necessarily in contact with fiber 116) causes changes in the multimode pattern, which in turn is detected by optical sensor 112. It is thus apparent that the single laser or LED 114 and fiber 116 may comprise an array of lasers or LEDs 114, matched to an array of fibers 116, matched to optical sensor 112 configured as an array (e.g., with a detector 51 employing an array of active areas 52, or an array of sensors 50, or with an array of sensors 112, each with one or more active areas).

It should also be apparent (from reading this disclosure) that optical sensor 112 can be used to sense output of fiber 116, resulting from input laser or LED 114, even when there is no source 118 of perturbation, such as within a communication system. A particularly useful configuration for optical sensor 112 is when it is employed or configured as a two-dimensional or three dimensional array, with fiber 116 replaced by a matching array of fibers, and LEDs 114 being replaced by an array of lasers or LED's. The optical sensor 112 in this configuration spatially matches the array of fibers and is more robust, for example, than the photodiode arrays used today in the prior art.

Figure 10:
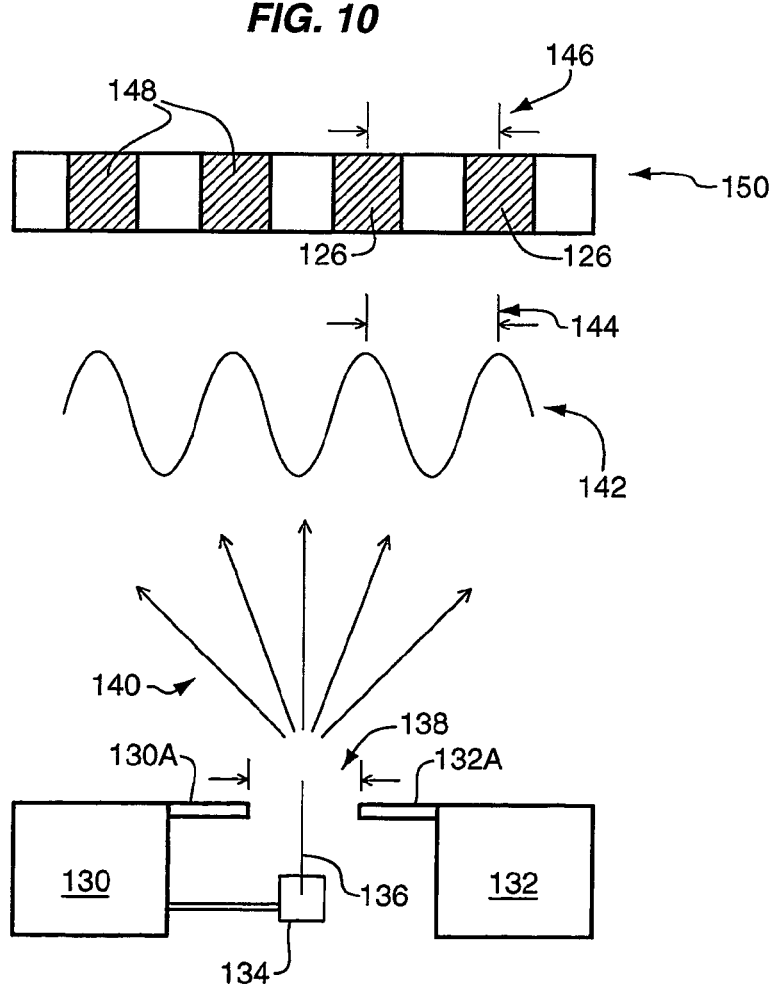
FIG. 10 schematically illustrates one illustrative method of alignment using a periodic mask and a detector.

Certain of the detectors described herein may function as a spatial filter, such as illustrated and discussed now in connection with FIG. 10. When the fringe spacing of an interference or diffraction pattern matches the detector spacing in the array, a large signal from each element results for certain spatial frequencies of the pattern (other frequencies may not be detected, for example frequencies with constructive and destructive parts of the pattern within a single active area). This selective frequency detection can be used to align two objects. If the objects are designed to form an aperture of a certain width when correctly aligned, then a light source can be placed behind this aperture and a detector array sensitive to the appropriate spatial frequencies can be placed in front of the aperture. As the objects are brought closer together, the sensor output increases until an optimal position is achieved. Because the spatial frequency of a diffraction pattern is very sensitive to aperture size, precise alignments are possible. An interferometer may be employed to achieve the same effect. These methods are for example useful in the alignment of masks in photolithography.

FIG. 10 shows an illustrative example of these methods, to enable precise alignment of two objects 130 and 132. A laser 134 generates a laser beam 136 that illuminates a small gap 138. The interaction between laser beam 136 and gap 138 generates diffracted light 140 that forms a diffraction pattern 142 with distinct spatial frequencies 144. When gap 138 has just the right size, diffraction pattern 142 matches the spacing 146 between active areas 148 of a detector 150 (e.g., detector 14 of FIG. 1 or detector 50 of FIG. 3), then a large signal may result (confirming the desired gap size). Illustratively, object 130 has an attached knife-edge 130A; laser 134 may also attach to object 130, if desired, while it emits beam 136. Object 132 also illustratively has an attached knife-edge 132A. As object 130 is brought closer to object 132, the two knife-edges 130A and 132A form aperture 138 of a particular width As noted, when the width is small enough, laser beam 136 diffracts past aperture 138, resulting in diffraction pattern 142 characterized by fringe spacing 144 (which depends on the aperture width and, thereby, on the relative spacing between objects 130 and 132). Pattern 142 is incident upon detector array 150, designed such that spacing 146 matches fringe spacing 144 under correct alignment conditions. Identical output from all active elements 149 indicates proper alignment. Similarly, since detector 150 is detecting relative motion between objects 130, 132, the output from detector 150 may further indicate tracking and/or an angular relationship (and not just alignment) between objects 130, 132.

In an alternative arrangement, fringes 142 may be produced by interference rather than through single-slit diffraction of gap 138. That is, objects 130, 132 may be formed as part of an interferometer to generate a similar pattern 142, which can also be detected by detector 150 (to determine alignment, angular positions and/or tracking of object 130 relative to object 132).

The processing of signals from individual active regions 148 by electronics (e.g., electronics 64, FIG. 3) may occur through one of several exemplary techniques. For example, one technique is to rectify and sum individual contributions from each active area 148. Summing contributions of positive and negative polarity separately, and then subtracting one from the other, further increases the signal and reduces common-mode noise. In another example, the largest of all signals on an element 148 is selected and monitored. In yet another example, individual contributions from elements 148 may be digitized, to allow extraction of the largest signal and to reduce noise through oversampling on a computer.

Figure 6:
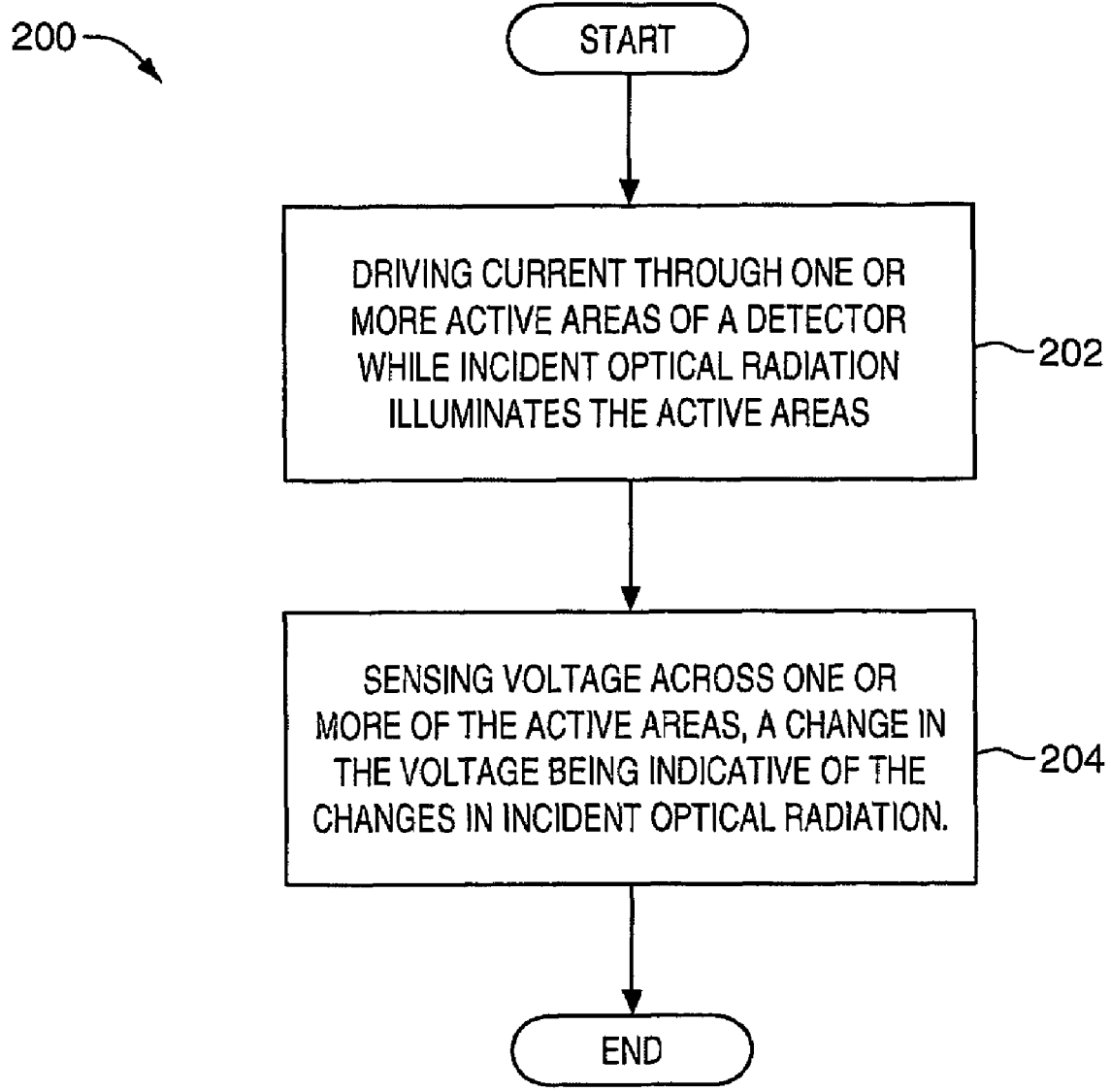
FIG. 6 shows a flow chart of one process of detecting changes in incident optical radiation.

FIG. 6 shows one process 200 for detecting changes in incident optical radiation. In step 202, current is driven through one or more active areas of a detector while the incident optical radiation illuminates the active areas. Step 202 is for example performed by source 32, FIG. 1 under control of electronics 64. Step 202 does not require constant illumination of the active areas by incident optical radiation, but may for example include motion of incident optical radiation over detector 14 (such as when speckle passes over detector 14, FIG. 1). In step 204, voltage is sensed across one or more of the active areas, a change in the voltage being indicative of the changes in incident optical radiation. Step 204 is for example performed by electronics 64, FIG. 3. Steps 202, 204 may occur substantially at the same time.

Figure 11:
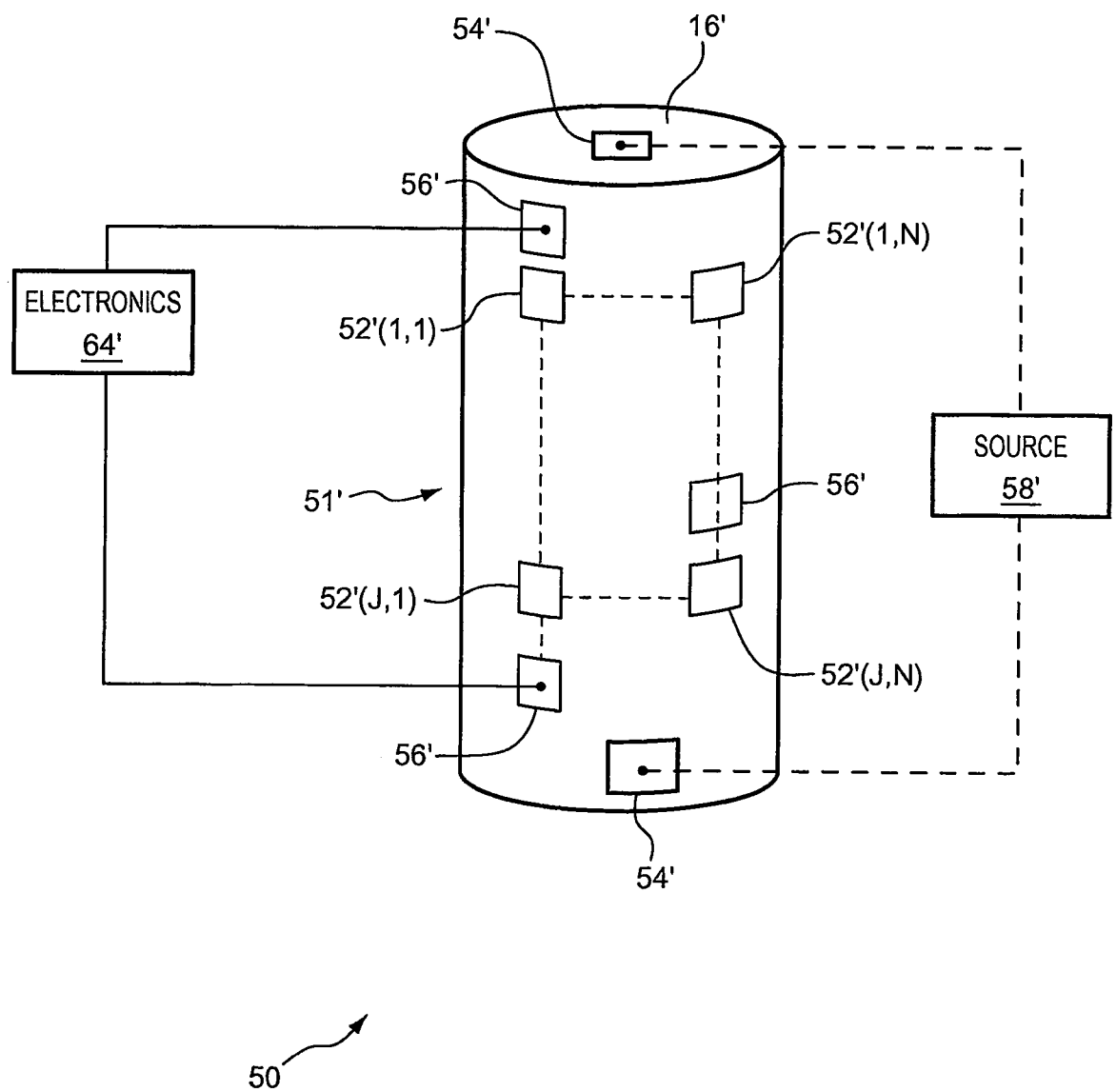
FIG. 11 shows one three-dimensional optical radiation detector.

FIG. 11 shows one three-dimensional optical sensor 50' employing an optical radiation detector 51', to illustrate how an array of active areas 52' may be constructed on a photoconductive surface 16' (on a cylindrical substrate, as shown). Active areas 52' are formed by placement of an array of sensing electrodes 56' onto photoconductive surface 16'—for example to provide like function to electrodes 56 and active areas 52 of FIG. 3 (only three electrodes 56' are shown for purposes of illustration). Electronics 64' (e.g., an observation instrument) connects to sensing electrodes 56' to determine voltage drop across active areas 52'. Injecting electrodes 54' are also disposed with photoconductive surface 16' so that current flows across each active area 52' (e.g., through connection to a source 58', e.g., a direct current source), such as injecting electrodes 54 and active areas 52 of FIG. 3. Only two electrodes 54' are shown for purposes of illustration; though more electrodes 54' may be included, if needed or desired. Photoconductive surface 16' in FIG. 11 is arranged on the outside of the cylinder substrate, though other shapes may be formed as a matter of design choice. The array of active areas 52' is illustratively shown as active areas 52'(1,1) ... 52'(J,N), where J, N are integers corresponding to the desired number of detecting elements for detector 51'.

Since certain changes may be made in the above methods, sensors and systems without departing from the scope hereof, it is intended that all matter contained in the above description or shown in the accompanying drawings be interpreted as illustrative and not in a limiting sense. For example, although the above description often discusses surface motion as the cause for change of incident optical radiation, it should be clear from reading the above disclosure that moving the detector through a stationary illumination pattern may also be employed to determine changes in incident optical radiation, to determine the motion of the detector relative to the means of generating the stationary optical pattern.

It is also to be understood that the following claims are to cover all generic and specific features described herein, and all statements of the scope which, as a matter of language, might be said to fall there between.

What is claimed is:

1. A method for detecting changes in a spatially nonuniform optical intensity distribution, comprising:
   driving current through one or more areas of photoconductive material of a detector, by means of at least one pair of first electrical contacts to source and sink the current, the at least one pair of first electrical contacts beyond each of the one or more areas of a photoconductive material, while incident optical radiation illuminates the one or more areas of photoconductive material; and
   measuring the voltage across one or more of the areas of photoconductive material using at least two second electrical contacts that are different than the at least one pair of first electrical contacts, a change in the measured voltage being indicative of a change in illumination.

2. The method of claim 1, wherein measuring the voltage comprises utilizing an observation instrument.

3. The method of claim 1, wherein measuring the voltage comprises determining cyclical variations in the voltage to isolate one or more frequencies with signal strength above a noise floor.

4. The method of claim 1, wherein measuring the voltage comprises determining transient variations in the voltage in one or both of a time domain and a frequency domain.

5. The method of claim 1, wherein measuring the voltage comprises determining periodic variations in the voltage in one or both of a time domain and a frequency domain.

6. The method of claim 2, wherein utilizing an observation instrument comprises utilizing one or more of a spectrum analyzer and oscilloscope.

7. The method of claim 1, further comprising determining motion of an object surface that causes the change in illumination.

8. The method of claim 7, wherein determining motion comprises analyzing the voltage in a time domain.

9. The method of claim 7, wherein determining motion comprises analyzing the voltage in a frequency domain.

10. The method of claim 7, further comprising:
    illuminating the surface with a laser having a wavelength that is smaller than defined geometric features of the surface such that moving speckle indicative of surface motion illuminates the one or more areas of photoconductive material while the current is driven through the one or more areas of photoconductive material; and
    determining surface motion by sensing voltage across one or more of the areas of photoconductive material from the at least two second electrical contacts.

11. The method of claim 10, wherein sensing the voltage comprises determining voltage signals in a time-domain.

12. The method of claim 10, wherein sensing the voltage comprises determining voltage signals in a frequency-domain.

13. The method of claim 7, wherein the motion of the object surface comprises surface displacement.

14. The method of claim 10, wherein illuminating the surface comprises generating an interference pattern that varies with surface motion and detecting the interference pattern by:
    driving current through the one or more areas of photoconductive material while the interference pattern illuminates the one or more areas of photoconductive material; and
    detecting the voltage across the one or more areas of photoconductive material to detect the surface motion from the at least two second electrical contacts.

15. The method of claim 14, wherein detecting the voltage comprises determining voltage signals in a time-domain.

16. The method of claim 15, wherein detecting the voltage comprises determining voltage signals in a frequency-domain.

17. The method of claim 14, wherein the surface motion comprises surface displacement.

18. The method of claim 1, wherein the incident optical radiation comprises an interference or diffraction pattern dependent upon a distance between two objects, further comprising:
    detecting changes in the interference or diffraction pattern to align the objects by:
    driving the current through the one or more areas of photoconductive material of the detector while the interference or diffraction pattern illuminates the areas of photoconductive material; and
    sensing voltage across the one or more areas of photoconductive material, wherein the change in the voltage indicates a change in the distance between the objects, and further comprising the steps of:
    assessing relative position between the objects; and
    aligning the objects, according to the changes in the interference or diffraction pattern.

19. The method of claim 18, wherein the incident optical radiation is generated by illuminating a gap between the objects with a laser.

20. The method of claim 18, wherein assessing relative position comprises assessing relative angles between the two objects, and wherein the change in the voltage indicates a change in the angular relationship between the objects.

21. The method of claim 1, wherein measuring the voltage comprises measuring voltage ratios across the one or more areas of photoconductive material to determine intensity ratios of the incident optical radiation.

22. The method of claim 1, further comprising comparing the time rate of change of the voltage across at least two of the areas of photoconductive material, a difference therein being indicative of spatial characteristics of the spatially nonuniform optical intensity distribution.

23. The method of claim 1, wherein driving the current through the one or more areas of photoconductive material, includes injecting current through the at least one pair of first electrical contacts.

24. The method of claim 1, wherein driving the current through the one or more areas of photoconductive material, includes continuously maintaining a current flow across the one or more areas of photoconductive material through the at least one pair of first electrical contacts.

25. The method of claim 1, wherein the at least one first pair of electrical contacts and the at least two second electrical contacts are in a plane of the detector.

26. A device for detecting changes in a spatially nonuniform optical intensity distribution incident on the device, comprising:
one or more areas of photoconductive material;
input electrodes beyond each of the one or more areas of photoconductive material, for driving current, provided by a source, through the one or more areas of photoconductive material;
output electrodes beyond each of the one or more areas of photoconductive material, for sensing a voltage drop across the areas of photoconductive material, the input electrodes being different from the output electrodes;
at least one conductive path connecting the input electrodes and the output electrodes to the one or more areas of photoconductive material; and
electronics connected to the output electrodes for determining a voltage across one or more of the areas of photoconductive material, a change in voltage being indicative of change in the optical intensity distribution.

27. The device of claim 26, wherein the source is selected from the group consisting of a constant current source, a voltage source, a time-varying current source, and a time-varying voltage source.

28. The device of claim 26, wherein the electronics are connected to the source and are configured to modulate the source so that current is modulated through the one or more areas of photoconductive material at a desired frequency, to improve signal to noise ratio.

29. The device of claim 26, wherein the detector, source and electronics arc configured to provide a four point measurement.

30. The device of claim 26, further comprising:
one or more optical fibers defining an array of optical fibers, the one or more optical fibers each including first ends and second ends;
one or more lasers generating one or more laser beams into the one or more first ends of the optical fibers; and,
the one or more areas of photoconductive material are matched to the optical fibers to detect the laser beams, the laser beams providing incident optical radiation, as light that reflects off of a moving surface into the one or more second ends of the array of optical fibers, wherein voltage drops across the areas of photoconductive material indicate motion of the surface.

31. The device of claim 30, wherein the array of optical fibers comprises multi-mode fibers.

32. The device of claim 30, wherein the array of optical fibers comprises single mode fibers.

33. The device of claim 26, further comprising:
a laser, a power splitter, and an optical fiber coupled to the power splitter;
the laser generating a laser beam into one or more arms of the power splitter; the laser beam exiting the optical fiber, reflecting off of a surface and reentering the optical fiber to interfere with the laser beam within the optical fiber; and
a detector arranged to detect interfering laser radiation from incident optical radiation, from the power splitter, the voltage drop being indicative of motion of the surface.

34. The device of claim 33, wherein the power splitter comprises at least one of a multi-mode fiber and a bulk optics power splitter.

35. The device of claim 26, wherein the photoconductive material comprises a semiconductor.

36. The device of claim 26, wherein the photoconductive material is selected from the group consisting of a III-V semiconductor and a II-VI semiconductor, the III-V semiconductor being defined by one or more components of the composition from the III column of the periodic table, and one or more components of the composition from the V column, the II-VI semiconductor being defined by one or more components of the composition from the II column of the periodic table, and one or more components of the composition from the VI column.

37. The device of claim 26, further comprising resistive material disposed between the electrodes and the one or more areas of photoconductive material.

38. The device of claim 26, further comprising semiconductive material disposed between the electrodes and the one or more areas of photoconductive material.

39. The device of claim 26, further comprising a mask to block incident optical radiation incident on at least one of the one or more areas of photoconductive material.

40. The device of claim 26, wherein the one or more areas of photoconductive material include at least three active areas, a first active area separating a first of the input electrodes from a first of the output electrodes, and a second active area separating a second of the input electrodes from a second of the output electrodes, such that current flows from the first input electrode through the first active area and from to the second input electrode through the second active area, such that the first input and output electrodes do not short-circuit, and such that the second input and output electrodes do not short-circuit.

41. The device of claim 26, wherein the one or more areas of photoconductive material form one of a two-dimensional and a three dimensional array.

42. The detector of claim 41, wherein the two-dimensional and the three dimensional array are used to detect output from a matching array of optical fibers.

43. The device of claim 26, wherein the input electrodes and the output electrodes coplanar.

44. The device of claim 43, wherein the input electrodes, the output electrodes and the one or more areas of photoconductive material are collinear in the plane.

* * * * *